United States Patent
Ying et al.

(10) Patent No.: US 12,082,162 B2
(45) Date of Patent: Sep. 3, 2024

(54) SEMI-STATIC RESOURCE ALLOCATION FOR NEW RADIO INTEGRATED ACCESS AND BACKHAUL (IAB) NETWORK

(71) Applicant: Apple Inc., Cupertino, CA (US)

(72) Inventors: Dawei Ying, Portland, OR (US); Lili Wei, Portland, OR (US); Qian Li, Beaverton, OR (US); Gang Xiong, Portland, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 17/286,564

(22) PCT Filed: Oct. 31, 2019

(86) PCT No.: PCT/US2019/059250
§ 371 (c)(1),
(2) Date: Apr. 19, 2021

(87) PCT Pub. No.: WO2020/092833
PCT Pub. Date: May 7, 2020

(65) Prior Publication Data
US 2021/0345303 A1  Nov. 4, 2021

Related U.S. Application Data

(60) Provisional application No. 62/754,336, filed on Nov. 1, 2018.

(51) Int. Cl.
*H04W 72/04* (2023.01)
*H04L 5/00* (2006.01)

(52) U.S. Cl.
CPC ........... *H04W 72/04* (2013.01); *H04L 5/0048* (2013.01)

(58) Field of Classification Search
CPC ............. H04L 5/0048; H04L 27/26025; H04L 5/0007; H04W 72/23
See application file for complete search history.

(56) References Cited

U.S. PATENT DOCUMENTS

| 2016/0088593 A1 | 3/2016 | Davydov et al. |
| 2018/0042031 A1 | 2/2018 | Hampel et al. |

(Continued)

FOREIGN PATENT DOCUMENTS

| CN | 108702282 B | 10/2018 |
| WO | 2018063892 A1 | 4/2018 |

OTHER PUBLICATIONS

PCT Search Report dated Feb. 24, 2020 in connection with PCT Application No. PCT/US2019/059250.

(Continued)

*Primary Examiner* — Yee F Lam
(74) *Attorney, Agent, or Firm* — Eschweiler & Potashnik, LLC

(57) ABSTRACT

A device of a wireless apparatus, a method and a machine readable medium to implement the method. The method includes: decoding a radio resource control (RRC) signal including an information element (IE) having an indication of a semi-statically configured soft resource; determining the soft resource based on the IE; and cancel, based on the soft resource, at least one of a transmission of an uplink (UL) communication or a reception of a downlink (DL) communication by the wireless apparatus.

22 Claims, 7 Drawing Sheets

(56) References Cited

U.S. PATENT DOCUMENTS

| | | | |
|---|---|---|---|
| 2019/0149269 A1* | 5/2019 | Chatterjee | H04W 72/1268 |
| | | | 370/329 |
| 2019/0165846 A1* | 5/2019 | Kim | H04L 1/0027 |
| 2019/0223084 A1* | 7/2019 | John Wilson | H04W 76/11 |
| 2019/0230689 A1* | 7/2019 | Cao | H04L 27/2602 |
| 2019/0312665 A1* | 10/2019 | Jo | H04L 27/26025 |
| 2019/0349180 A1* | 11/2019 | Lu | H04L 27/2607 |
| 2021/0045139 A1* | 2/2021 | Takeda | H04W 76/11 |

OTHER PUBLICATIONS

PCT Written Opinion dated Feb. 24, 2020 in connection with PCT Application No. PCT/US2019/059250.

Qualcomm Incorporated, Resource Management in IAB Network, R1-1811258, 3GPP TSG RAN WG1 Meeting #94bis, Chendu, China, s Sep. 29, 2018 ections 2.1-2.3.

Intel Corporation, PHY layer enhancements for NR IAB R1-1808691, 3GPP TSG RAN WG1 #94, Gothenburg, Sweden, Aug. 11, 2018 sections 2.1-4.3; and table 2.2-1.

AT&T Remaining issues in DL/UL resource allocation, R1-1802599, 3GPP TSG WG1 Meeting #92, Athens, Greece Feb. 17, 2018 sections 2.4,6.

Samsung, Necessary Enhancements for NR IAB, R1-1810864, 3GPP TSG RAN WG1 Meeting #94b, Chendu, China, Sep. 28, 2018 section 2.

LG Electronics; "Remaining issues on UL data transmission procedure"; 3GPP TSG RAN WG1 Meeting #92; R1-1802215; Feb. 26, 2018.

* cited by examiner

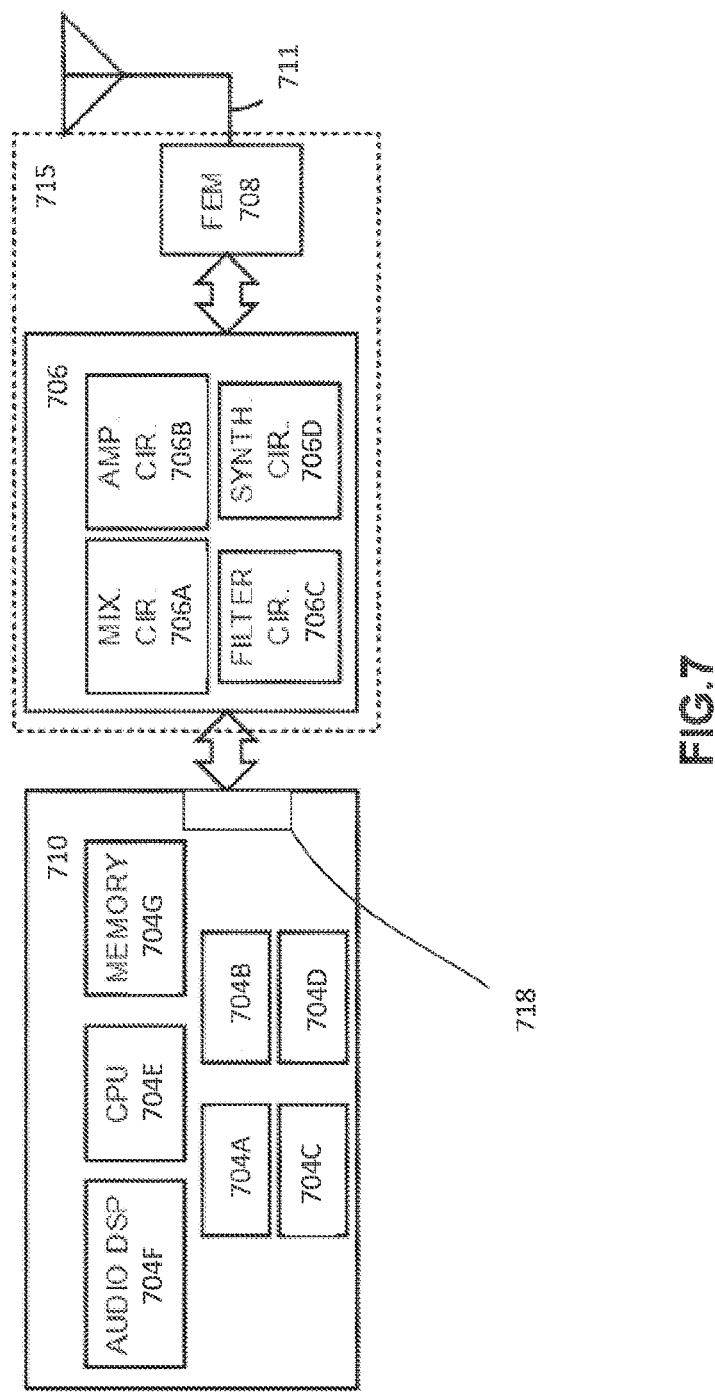

SEMI-STATIC RESOURCE ALLOCATION FOR NEW RADIO INTEGRATED ACCESS AND BACKHAUL (IAB) NETWORK

CROSS REFERENCE TO RELATED APPLICATIONS

This application is a National Phase entry application of International Patent Application No. PCT/US2019/059250 filed Oct. 31, 2019, which claims the benefit of and priority from U.S. Provisional Patent Application No. 62/754,336 entitled "SEMI-STATIC RESOURCE ALLOCATION FOR NEW RADIO INTEGRATED ACCESS AND BACKHAUL (IAB) NETWORK" filed Nov. 1, 2018, the entire disclosure of which is incorporated herein by reference.

FIELD

Various embodiments generally relate to the field of cellular communications, and particularly to resource allocation in integrated access and backhaul (IAB) networks.

BACKGROUND

Current Third Generation Partnership Project (3GPP) New Radio (NR) specifications (or 5G specifications) do not specifically address issues related to resource management in an IAB network where uplink (UL) and downlink (DL) resources are scheduled as between a centralized unit (CU), one or more IAB nodes, and a mobile terminal (MT).

BRIEF DESCRIPTION OF THE DRAWINGS

FIG. 7 illustrates example components of baseband circuitry and radio front end modules (RFEM) in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In the New Radio (NR) Integrated Access and Backhaul (IAB) Study Item (SI), the following may be possible:

(a) From a mobile terminal (MT) point-of-view, the following time-domain resources may be indicated for the parent link as in NR:
  i. Downlink time resource;
  ii. Uplink time resource;
  iii. Flexible time resource.
(b) From a distributed unit (DU) point-of-view, the child link has the following types of time-domain resources
  i. Downlink time resource;
  ii. Uplink time resource;
  iii. Flexible time resource; and
  iv. Unavailable time resources (not to be used for communication on the DU child links)
(c) For each of the downlink, uplink and flexible time-resource types of the DU child link, there are two flavors: hard and soft:
  i. hard flavor: where the corresponding time resource is always available for the DU child link; and
  ii. soft flavor: where the availability of the corresponding time resource for the DU child link is explicitly and/or implicitly controlled by the parent node.

Figure 1:
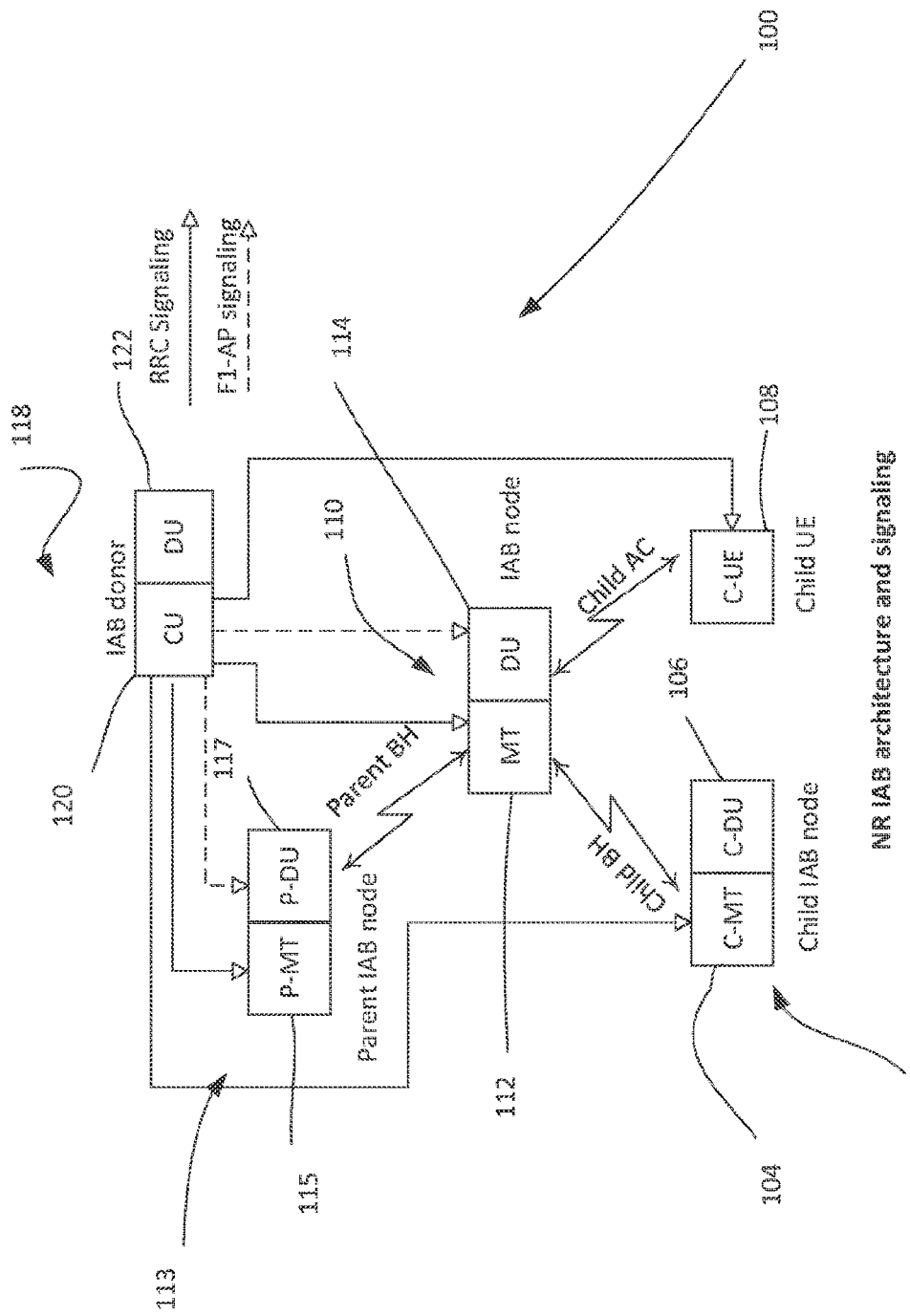
FIG. 1 illustrates an IAB network architecture according to an embodiment.

In FIG. 1, a IAB network architecture and signaling diagram 100 is shown, where the definitions of links (parent (P), child (C), backhaul (BH), and access (AC)), nodes (central or centralized Unit (CU), DU, MT, and user equipment (UE), etc.), and the corresponding signaling (radio resource control (RRC) or FI application protocol (FI-AP)) are illustrated. The FI interface is a 5G radio network layer signaling protocol for signaling service between a next generation NodeB (gNodeB)-CU and a gNodeB-DU. The FI Application Protocol (F1AP) is an application protocol that supports the functions and signaling services of the FI interface. FI-AP services are divided into two groups: non-UE-associated services and UE-associated services. Non-UE-associated services are services related to the whole FI interface instance between the gNodeB-DU and gNodeB-CU utilizing a non UE-associated signaling connection. UE-associated services are services related to one UE. FI-AP functions that provide these services are associated with a UE-associated signaling connection that is maintained for the UE in question.

Referring still to FIG. 1, network architecture 100 includes a child IAB node 102 including a child mobile terminal (C-MT) 104, and a child DU (C-DU) 106, a child user equipment (UE) (C-UE) 108, an IAB node 110 including a MT 112 and DU 114, a parent IAB node 113 including a parent MT (P-MT) 115 and a parent DU (P-DU) 117, and an IAB donor 118 including a CU 120 and a DU 122. In the shown network architecture 100, C-MT 104 of child IAB node 102 is to exchange BH communications with the DU 114 of IAB node 110, and C-UE 108 is to exchange child AC communications with the DU 114, while MT 112 of IAB node 114 is to exchange parent BH communications with the P-DU 116 of parent IAB node 112.

The continuous arrows in FIG. 1 depict possible RRC signaling, while the broken arrows depict possible FI-AP signaling, both from the IAB donor 118 CU 112. In particular, as shown in FIG. 1, the CU 120 may according to embodiments, send RRC signaling to one or more of P-MT 114 of parent IAB node 112, MT 112 of IAB node 110, C-MT 104 of child IAB node 102, and C-UE 108. CU 120 of IAB donor 118 may further send FI-AP signaling to the P-DU 116 of parent IAB node 112, and to DU 114 of IAB node 110.

According to embodiments, the soft flavor resource allocation as described above may be explicitly communicated to child mobile terminals (C-MTs), such as C-MT 104, or UEs such as child UE 108, for example and especially for UL and flexible resources. Otherwise, C-MT 104 or child UE 108 may transmit grant-free UL transmissions, physical random access channel PRACH transmissions, and physical uplink control channel PUCCH transmissions for scheduling requests (SR) in a soft UL or soft flexible resource, risking these UL transmission not being correctly received at the DUs, such as C-DU 106.

Embodiments herein present RRC based signaling (RRC signaling) for semi-static soft resource allocation from an IAB donor node's CU (such as CU 120 of IAB donor 118) to C-MTs and UEs (such as to P-MT 114, C-MT 104, C-UE 108 and MT 112). For example, embodiments herein include RRC signaling for resource allocation enhancement in a NR IAB network, such as network 100. The signaling is from IAB donor CU to C-MTs or UEs, and it is used to indicate semi-static soft resource configuration to C-MTs or UEs. C-MT and UE behavior may be specified to give soft resource allocation and related overwriting rules on DL/UL direction determination.

Brief Overview on Semi-Static Resource Allocation in NR

Sometimes, a Tx/Rx Point (TRP) uses RRC field TDD-UL-DL-ConfigCommon to configure cell-specific UL/DL assignments, and it uses TDD-UL-DL-ConfigDedicated to configure a UE-specific UL/DL assignment. Both cell-specific and UE-specific semi-static configuration follow the same UL/DL pattern: DL-F-UL.

In a NR IAB network, a soft flavor resource can be configured on a child link from a DU's point of view to allow a utilization unused parent link resources that the DU is aware of. Soft allocation may be communicated dynamically or semi-statically to C-MTs or UEs. First, soft allocation may be used to avoid RRC configured UL transmission in soft UL and flexible resource, e.g., RRC configured physical uplink shared channel (PUSCH), PUCCH, PRACH, and sounding reference signal (SRS). Otherwise, if not avoided, these uplink transmissions can either be lost due to an IAB node transmitting in a parent link or can cause interference to an IAB node receiving in parent link. Second, soft allocation may be used to cancel RRC configured DL reception in soft DL and flexible resource, e.g., RRC configured physical downlink shared channel (PDSCH), channel state information reference signal (CSI-RS).

Otherwise, if these DL communications are not cancelled, the channel estimation at C-MTs and UEs may be affected. Embodiments herein present semi-static soft resource allocation to C-MTs and UEs to prevent RRC configured UL transmission and RRC configured DL reception on a specified soft resource.

Figure 2:
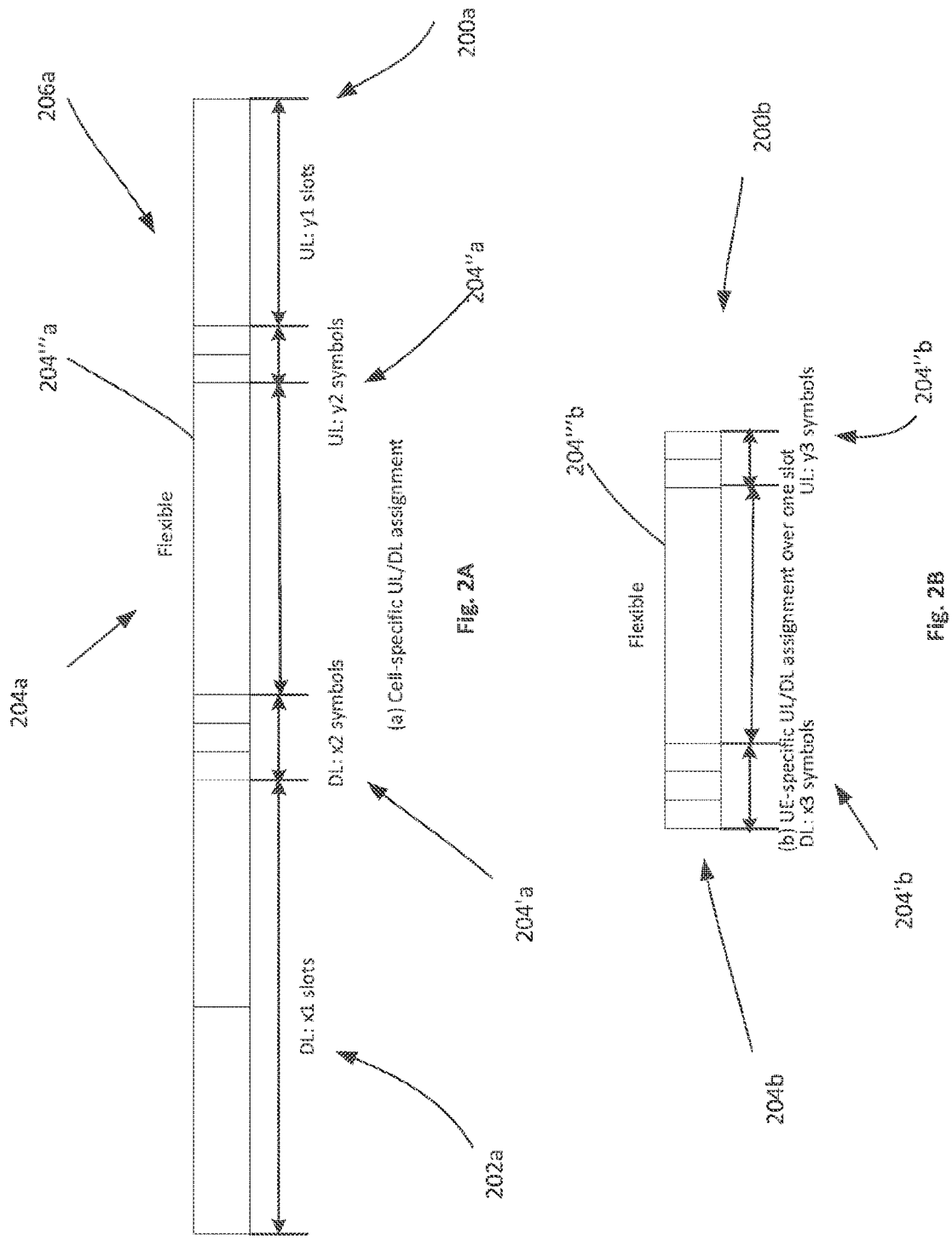
FIG. 2A illustrates a radio transmission involving cell-specific DL/UL resource assignments according to an embodiment.
FIG. 2B illustrates a radio transmission involving user equipment-specific (UE-specific) DL/UL resource assignments according to an embodiment.

Reference is now made to FIGS. 2A and 2B, which show respective radio transmissions 200a and 200b for a cell-specific UL/DL assignment and for a UE-specific UL/DL assignment over one slot. The scenarios in each of FIGS. 2A and 2B will be discussed in more detail further below.

Cell-Specific Semi-Static Soft Resource Allocation in RRC

Reference in the context of cell-specific semi-static soft resource allocation is now made to FIG. 2A. FIG. 2A shows a radio transmission 200a including a DL transmission 202a in x1 slots, a flexible (F) transmission 204a including a DL transmission 204'a in x2 symbols, a UL transmission 204"a in y2 symbols, and flexible symbols 204'''a therebetween, and an UL transmission 206a in y1 slots.

In one embodiment, a field, softStartAndLengthList, may be defined in RRC information element (IE) TDD-UL-DL-ConfigCommon to signal cell-specific soft resource allocation to C-MTs or UEs. It is a start and length indicator (SLIV), for each slot within the DL/UL configuration, and may be used to indicate to C-MTs or UEs of a cell which symbols are labelled as a soft resource within said each slot. The TDD-UL-DL-ConfigCommon according to an embodiment may be configured as follows:

```
TDD-UL-DL-ConfigCommon ::= SEQUENCE]
  referenceSubcarrierSpacing SubcarrierSpacing,
  patternI TDD-UL-DL-Pattern,
  softStartAndLengthList. SEQUENCE ( SIZE (I..maxNrofSlots) )
    of INTEGER(0..127),
}
``` with the following field description:

| softStartAndLengthList |
|---|
| Semi-static configured soft resource within a DL/UL configuration pattern. For each slot within the pattern, a SLIV is configured to indicate which symbols in the slot are semi-statistically soft. |

Figure 3:
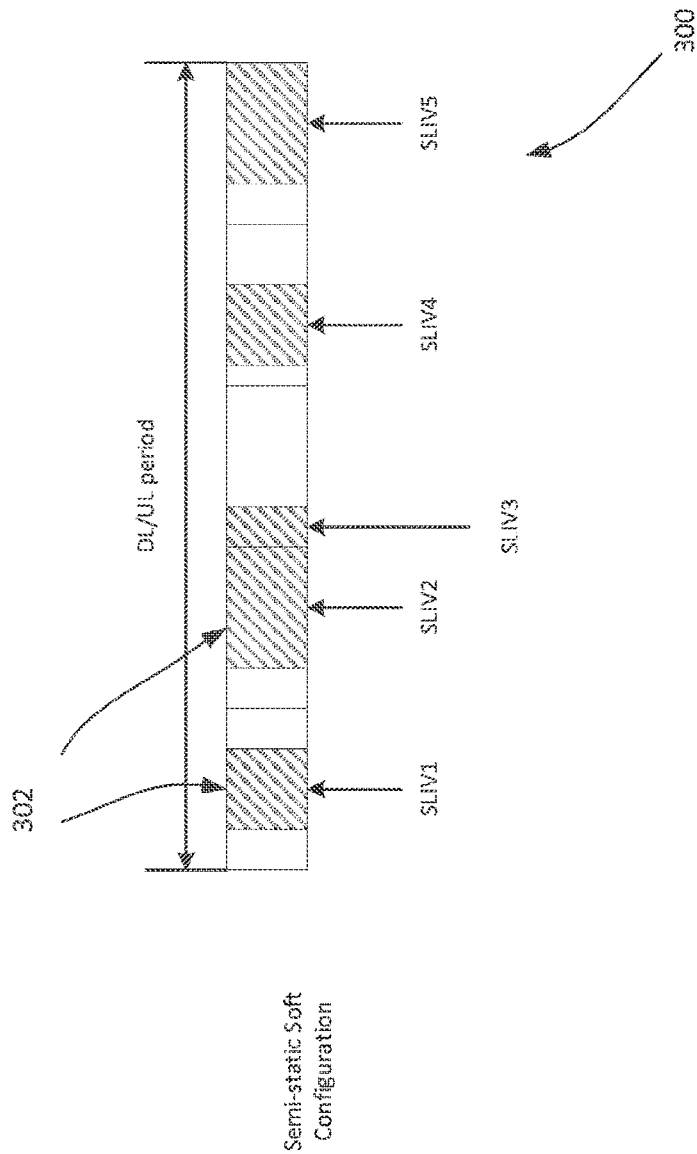
FIG. 3 illustrates a radio transmission with a semi-static DL/UL soft configuration according to one embodiment.

Reference with respect to the above embodiment for us of the SLIV is now made to FIG. 3. FIG. 3 shows a DL/UL radio frame transmission 300 in a DL/UL period, where, for each slot 302 within the pattern, a SLIV (SLIV1, SLIV2, SLIV3, SLIV4 and SLIV5) was configured to indicate which symbols (as indicated by the arrows from each SLIV) in the slot are semi-statically soft.

According to another embodiment, the soft resource pattern may be configured via a RRC IE Soft-Resource-Pattern, which is to explicitly state the starting slot/symbol and duration for each block of resources marked as soft. The Soft-Resource-Pattern and each SoftBlock within the pattern may be configured as follows:

```
Soft-Resource-Pattern ::= SEQUENCE!
  softBlockList, SEQUENCE ( SIZE (I..maxNrofSoftBlocks) ) of SoftBlock,
    OPTIONAL
}
SoftBlock ::= SEQUENCE!
  softBlockStartingSlot, INTEGER (CLmaxNrofSlots − 1),
  softBlockStartingSymbol, INTEGER (0..maxNrofSymbols − 1),
  softBlockDurationSlots, INTEGER (0..maxNrofSlots − 1),
  softBlockDurationSymbols,
  INTEGER (CLmaxNrofSymbols − 1),
}
``` with the following field description:

| |
|---|
| Soft-Resource-Pattern |
| Semi-static configured soft resource within a DL/UL configuration pattern. |
| SoftBlock |
| A block of resources are marked as soft. It specifies the starting slot/ |
| symbol and the duration of the block |
| SoftBlockStartingSlot |
| Specifies the starting slot in the DL/UL configuration pattern |
| SoftBlockStartingSymbol |
| Specifies the starting slot in the DL/UL configuration pattern |
| SoftBlockDurationSlots |
| Specifies the starting slot in the DL/UL configuration pattern |
| SoftBlockDurationSymbols |
| Specifies the starting slot in the DL/UL configuration pattern |

Figure 4:
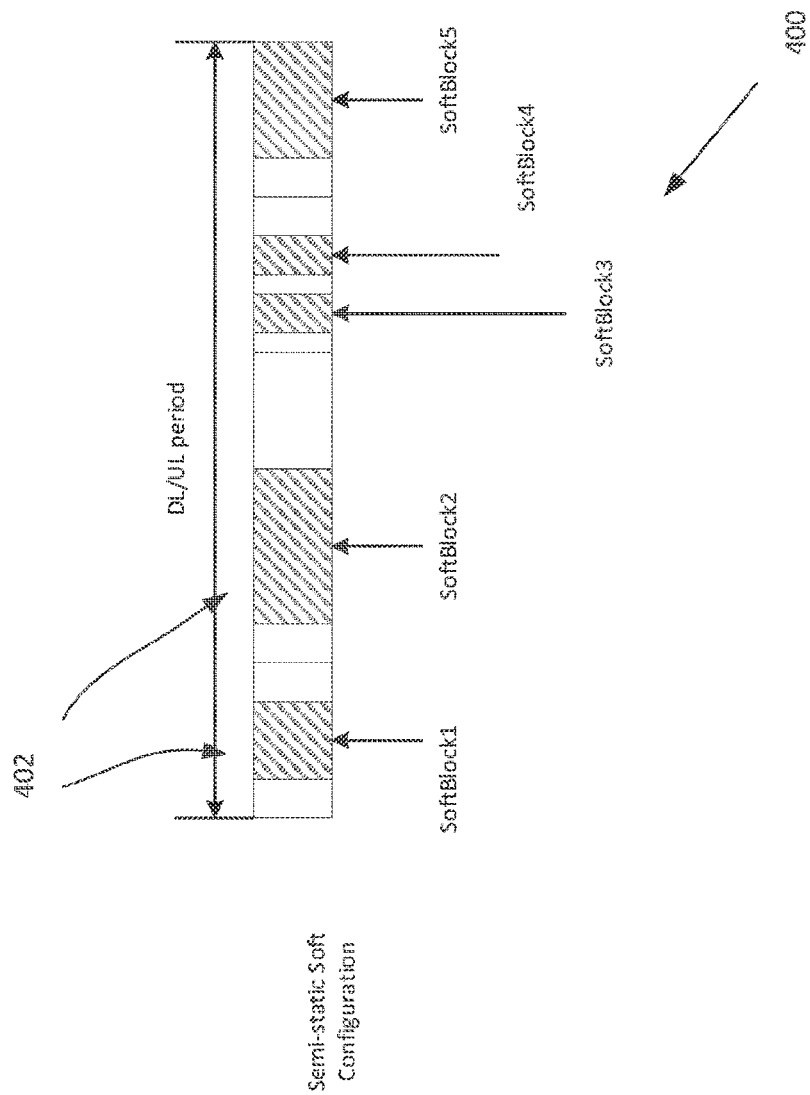
FIG. 4 illustrates a radio transmission with a semi-static DL/UL soft configuration according to another embodiment.

FIG. 4, Semi-Static Soft Configuration Using SoftBlock

Reference with respect to the above embodiment for us of the Soft-Resource-Block pattern and SoftBlock is now made to FIG. 4. FIG. 4 shows a DL/UL radio frame transmission 400 in a DL/UL period, where, for each slot 02 within the pattern, a SoftBlock (SoftBlock1, SoftBlock2, SoftBlock3, SoftBlock4 and SoftBlock5) was configured to indicate which symbols (as indicated by the arrows from each SoftBlock) in the slot are semi-statically soft.

UE-Specific Semi-Static Soft Resource Allocation in RRC

In one embodiment, a field, softStartAndLength, may defined in RRC IE TDD-UL-DL-ConfigDedicated to signal UE-specific soft resource allocation to C-MTs or UEs. Similar to the cell-specific configuration, the TDD-UL-DL-ConfigDedicted is a SLIV to indicate which parts of the slot are soft.

In another embodiment, the soft resource pattern are configured via a RRC IE Soft-Slot-Pattern, explicitly stating the starting symbol and duration. Note that since the UE-specific configuration is per slot, then softBlockStartingSlot=0 and softBlockDurationSlots=0 in every SoftBlock in Soft-Slot-Pattern, an example configuration of which is provided below:

| |
|---|
| Soft-Slot-Pattern ::= SEQUENCE] |
| softBlockList, SEQUENCE ( SIZE (I..maxNrofSoftBlocks) ) of SoftBlock, OPTIONAL |
| } |

C-MT/UE Behavior with Soft Slot/Symbol to Determine DL/UL Direction

The soft resource used by IAB DU (such as DU 114 of IAB node 110 of FIG. 1) must be a subset of a semi-statically configured soft resource at its C-MTs/UEs (such as C-MTS 104/C-UE 108 of FIG. 1). A C-MT/UE may cancel its RRC configured DL reception and UL transmission within the configured soft symbols, and may receive a DL transmission within a set of soft symbols only if such DL transmission is scheduled by downlink control information (DCI) or configured for synchronization signal block (SSB). A C-MT/UE may transmit a UL transmission within a set of soft symbols only if such UL transmission is scheduled by DCI. Detailed DL/UL determination procedure are specified as follows.

For a set of symbols indicated to a UE for reception of synchronization signal/physical broadcast channel (SS/PBCH) blocks, according to an embodiment, the UE does not expect to get a configuration indicating the set of symbols as soft.

If a C-MT/UE is configured by higher layers to receive a CSI-RS or a PDSCH in a set of symbols and a subset of symbols from the set of symbols are configured as soft by TDD-UL-DL-ConfigCommon or TDD-UL-DL-ConfigDedicated to UE, then the UE cancels PDSCH and CSI-RS reception in the set of symbols.

If a C-MT/UE is configured by higher layers to transmit periodic SRS, or PUCCH, or PUSCH, or PRACH in a set of symbols and a subset of symbols from the set of symbols are configured as soft by TDD-UL-DL-ConfigCommon or TDD-UL-DL-ConfigDedicated to UE, then the UE cancels periodic SRS, PUCCH, PUSCH, and PRACH transmission in the set of symbols.

Figure 5:
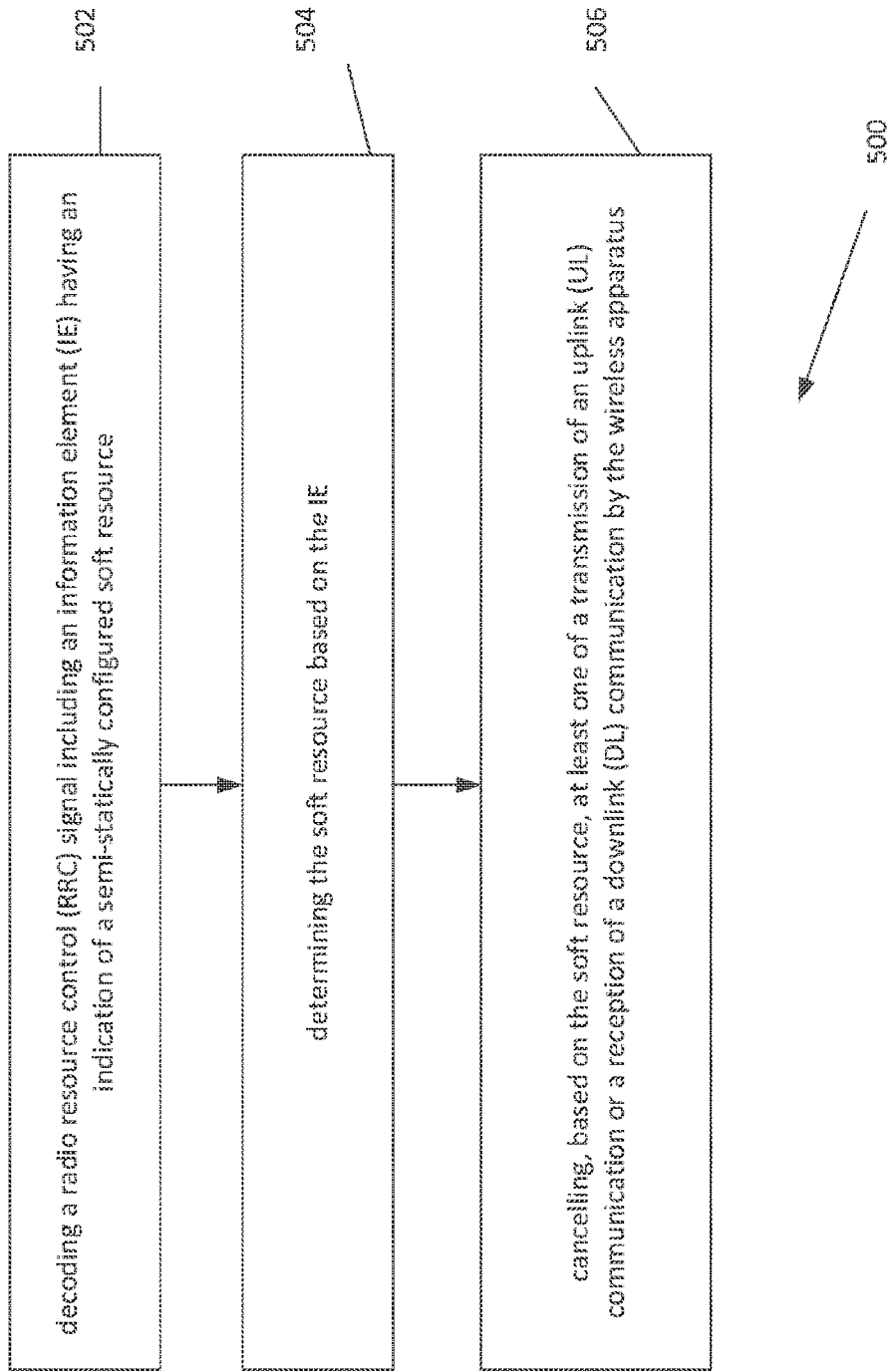
FIG. 5 illustrates a process according to an embodiment.

FIG. 5. Illustrates a process 500 according to embodiments. At operation 502, decoding a radio resource control (RRC) signal including an information element (IE) having an indication of a semi-statically configured soft resource; at operation 504, determining the soft resource based on the IE and at operation 506, cancelling, based on the soft resource, at least one of a transmission of an uplink (UL) communication or a reception of a downlink (DL) communication by the wireless apparatus.

Figure 6:
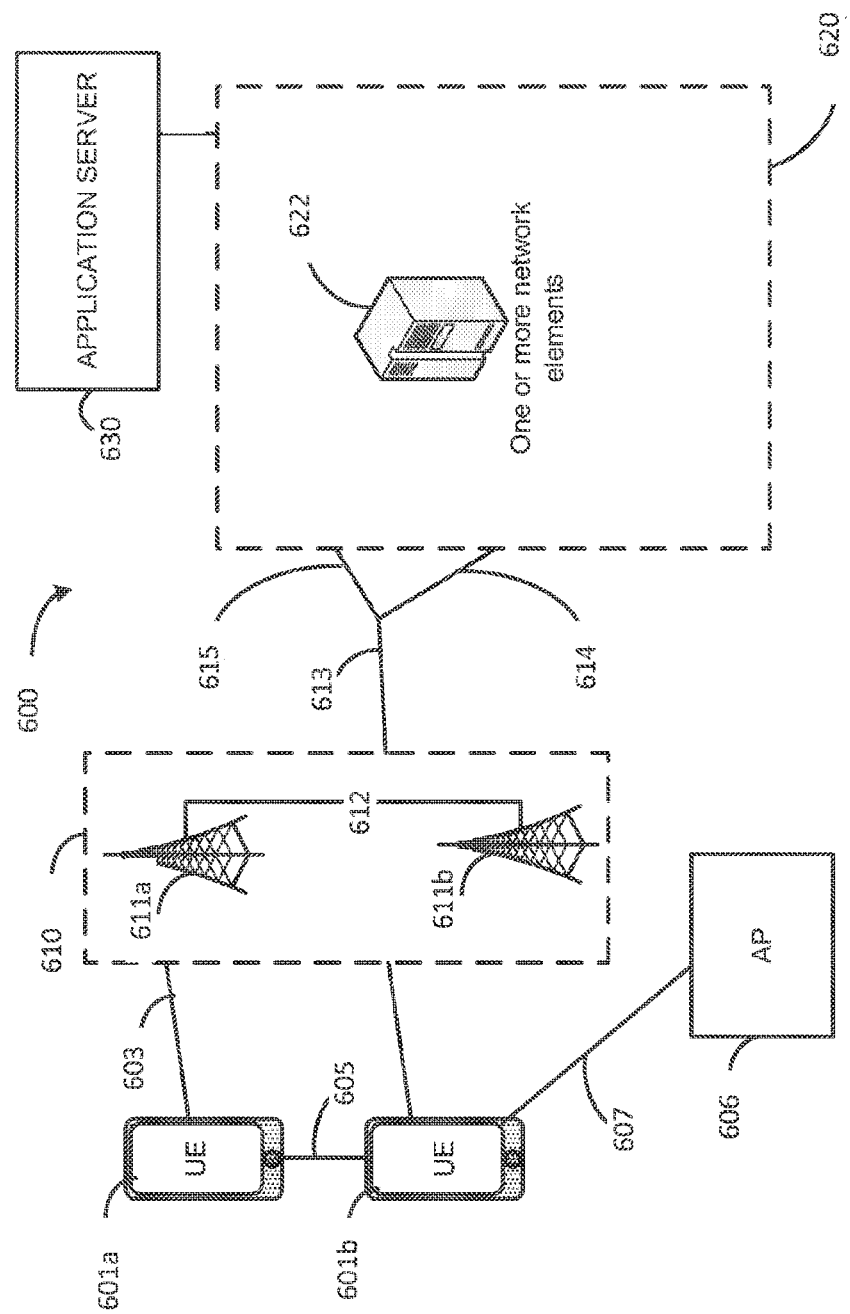
FIG. 6 illustrates an example architecture of a system of a network, in accordance with various embodiments.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 601a and UE 601b (collectively referred to as "UEs 601" or "UE 601"). In this example, UEs 601 are illustrated as smartphones, but may also comprise any mobile or non-mobile computing device.

The UEs 601 may be configured to connect, for example, communicatively couple, with an or RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a U MTS protocol, a 3GPP LTE protocol, a 5G protocol, a N R protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601b is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to be connected to the Internet without connecting to the core network of the wireless system (described in further detail below).

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, N R evolved NodeBs (gNodeBs), RAN nodes, eN Bs, NodeBs, RSUs, TRxPs or TRPs, and so forth. As used herein, the term "NG RAN node" or the like may refer to a RAN node 611 that operates in an N R or 5G system 600 (for example, a gN B), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the U Es 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the U Es 601 and the RAN nodes 611, 612 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 M Hz to approximately 3.8 GHz, whereas the unlicensed spectrum may include the 5 GHz band.

The RAN nodes 611 may be configured to communicate with one another via interface 612. In embodiments where the system 600 is a 5G or N R system, the interface 612 may be an Xn interface 612. The Xn interface is defined between two or more RAN nodes 611 (e.g., two or more gNodeBs or gN Bs and the like) that connect to 5GC 620, between a RAN node 611 (e.g., a gNB) connecting to 5GC 620 and an eN B, and/or between two eN Bs connecting to 5GC 620.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium).

Generally, the application server 630 may be an element offering applications that use IP bearer resources with the core network (e.g., UMTS PS domain, LTE PS data services, etc.). The application server 630 can also be configured to support one or more communication services (e.g., VoIP sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a UPF, and the SI control plane (NG-C) interface 615, which is a signaling interface between the RAN nodes 611 and AMFs.

In embodiments, the CN 620 may be a 5G CN (referred to as "5GC 620" or the like), while in other embodiments, the CN 620 may be an EPC). Where CN 620 is an EPC (referred to as "EPC 620" or the like), the RAN 610 may be connected with the CN 620 via an SI interface 613. In embodiments, the SI interface 613 may be split into two parts, an SI user plane (SI-U) interface 614, which carries traffic data between the RAN nodes 611 and the S-GW, and the SI-MME interface 615, which is a signaling interface between the RAN nodes 611 and MMEs.

FIG. 7 illustrates example components of baseband circuitry 710 and radio front end modules (RFEM) 715 in accordance with various embodiments. Baseband circuitry 710 includes a RF interface 718 connecting it to the RFEM. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/ demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with an application circuitry for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real time OS (RTOS), which when executed by the CPU 704E (or other baseband processor), is to cause the CPU 704E (or other baseband processor) to manage resources of the baseband circuitry 710, schedule tasks, etc. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices RF circuitry 706 may enable communication with wireless networks using modulated electromagnetic radiation through a non-solid medium.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

One or more of the components of FIGS. 6 and/or 7, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The components of FIGS. 6 and/or 7, such as the shown baseband processing circuitry including processing circuitry and a RF interface, may be used in any of the embodiments described herein, such as in a gNodeB or in a UE.

In some embodiments, the electronic device(s), network(s), system(s), chip(s) or component(s), or portions or implementations thereof, of FIG. 6 or 7, or some other figure herein, may be configured to perform one or more processes, techniques, or methods as described herein, or portions thereof. One such process is depicted in FIG. 5.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, the electronic device(s), network(s), system(s), chip(s) or component(s), or portions or implementations thereof, of FIGS. 6 and 7, or some other figure herein, may be configured to perform one or more processes, techniques, or methods as described herein, or portions thereof.

In some embodiments, the electronic device of FIGS. 6 and 7 may be configured to perform one or more processes, techniques, and/or methods as described herein, or portions thereof.

EXAMPLES

Example 1 includes a device of a wireless apparatus, the device including processing circuitry and a radio frequency (RF) interface coupled the processing circuitry, the processing circuitry to: decode a radio resource control (RRC) signal including an information element (IE) having an indication of a semi-statically configured soft resource; determine the soft resource based on the IE; and cancel, based on the soft resource, at least one of a
transmission of an uplink (UL) communication or a reception of a downlink (DL) communication by the wireless apparatus.

Example 2 includes the subject matter of Example 1, and optionally, wherein the RRC signal is from an integrated access and backhaul (IAB) donor central unit (CU).

Example 3 includes the subject matter of Example 2, and optionally, wherein the wireless apparatus is one of a new radio (NR) user equipment (UE) or a mobile terminal (MT) of a child IAB node (C-MTS).

Example 4 includes the subject matter of Example 2, and optionally, wherein the semi-statically configured soft resource includes a plurality of semi-statically configured soft resources, and wherein the processing circuitry is to use a subset of the semi-statically configured soft resources for backhaul or access communications.

Example 5 includes the subject matter of Example 1, and optionally, wherein the semi-statically configured soft resource is one of cell-specific or user equipment (UE)-specific.

Example 6 includes the subject matter of Example 5, and optionally, wherein the indication is included in a TDD-UL-DL-ConfigCommon for the cell-specific semi-statically configured soft resource, or in a TDD-UL-DL-ConfigDedicated for a UE-specific semi-statically configured soft resource.

Example 7 includes the subject matter of Example 1, and optionally, wherein the processing circuitry is to determine a UL or DL direction of a slot or symbol based on the semi-statically configured soft resource.

Example 8 includes the subject matter of any one of the Examples above, and optionally, wherein the IE includes one of: a start and length indicator (SLIV) for a slot within a downlink (DL) or an uplink (UL) resource configuration for the wireless apparatus, the SLIV to indicate symbols labelled as semi-statically configured soft resources within the DL or UL resource configuration; or a Soft-Resource-Pattern to explicitly state a starting slot or symbol and duration for each block of the semi-statically configured soft resource.

Example 9 includes the subject matter of any one of the Examples above, and optionally, wherein the uplink (UL) communication corresponds to a RRC configured UL transmission by the wireless apparatus and the downlink (DL) communication corresponds to a RRC configured DL reception by the wireless apparatus within the semi-statically configured soft resource.

Example 10 includes the subject matter of any one of the Examples above, and optionally, wherein: the DL communication includes at least one of a channel state information reference signal (CSI-RS) or a physical downlink shared channel (PDSCH); and the UL communication includes at least one of a sounding reference signal (SRS), a physical uplink control channel (PUCCH), a physical uplink shared channel (PUSCH), or a physical random access channel (PRACH).

Example 11 includes the subject matter of Example 10, and optionally, wherein the processing circuitry is to decode higher layer signaling and to configure the CSI-RS and the PDSCH in a subset of symbols of the semi-statically configured soft resource based on the higher layer signaling.

Example 12 includes the subject matter of any one of the Examples above, and optionally, wherein the processing circuitry is to: decode a DL transmission to the wireless apparatus within the soft resource only if the DL transmission is scheduled by downlink control information (DCI) or configured for synchronization signal block (SSB); and encode an UL transmission for transmission by the wireless apparatus in the soft resource only if the UL transmission is scheduled by DCI.

Example 13 includes the subject matter of Example e of any one of Examples 1-12, further including a front-end module coupled to RF interface.

Example 14 includes the subject matter of Example 13, and optionally, further including one or more antennas coupled to the front-end module to receive and transmit signals for processing by the processing circuitry.

Example 15 includes a method to be performed at a device of a wireless apparatus, the method including: decoding a radio resource control (RRC) signal including an information element (IE) having an indication of a semi-statically configured soft resource; determining the soft resource based on the IE; and cancelling, based on the soft resource, at least one of a transmission of an uplink (UL) communication or a reception of a downlink (DL) communication by the wireless apparatus.

Example 16 includes the subject matter of Example 15, and optionally, wherein the RRC signal is from an integrated access and backhaul (IAB) donor central unit (CU).

Example 17 includes the subject matter of Example 16, and optionally, wherein the wireless apparatus is one of a new radio (N R) user equipment (UE) or a mobile terminal (MT) of a child IAB node (C-MTS).

Example 18 includes the subject matter of Example 16, and optionally, wherein the semi-statically configured soft resource includes a plurality of semi-statically configured soft resources, the method further including using a subset of the semi-statically configured soft resources for backhaul or access communications.

Example 19 includes the subject matter of any one of the Examples above, and optionally, wherein the semi-statically configured soft resource is one of cell-specific or user equipment (UE)-specific.

Example 20 includes the subject matter of any one of the Examples above, and optionally, wherein the indication is included in a TDD-UL-DL-ConfigCommon for the cell-specific semi-statically configured soft resource, or in a TDD-UL-DL-ConfigDedicated for a UE-specific semi-statically configured soft resource.

Example 21 includes the subject matter of any one of the Examples above, and optionally, further including determining a UL or DL direction of a slot or symbol based on the semi-statically configured soft resource.

Example 22 includes the subject matter of any one of the Examples above, and optionally, wherein the IE includes one of: a start and length indicator (SLIV) for a slot within a downlink (DL) or an uplink (UL) resource configuration for the wireless apparatus, the SLIV to indicate symbols labelled as semi-statically configured soft resources within the DL or UL
resource configuration; or a Soft-Resource-Pattern to explicitly state a starting slot or symbol and duration for each block of the semi-statically configured soft resource.

Example 23 includes the subject matter of any one of the Examples above, and optionally, wherein the uplink (UL) communication corresponds to a RRC configured UL transmission by the wireless apparatus and the downlink (DL) communication corresponds to a RRC configured DL reception by the wireless apparatus within the semi-statically configured soft resource.

Example 24 includes the subject matter of any one of the Examples above, and optionally, wherein: the DL communication includes at least one of a channel state information reference signal (CSI-RS) or a physical downlink shared channel (PDSCH); and the UL communication includes at least one of a sounding reference signal (SRS), a physical uplink control channel (PUCCH), a physical uplink shared channel (PUSCH), or a physical random access channel (PRACH).

Example 25 includes the subject matter of Example 24, and optionally, further including decoding higher layer signaling, and configuring the CSI-RS and the PDSCH in a subset of symbols of the semi-statically configured soft resource based on the higher layer signaling.

Example 26 includes the subject matter of any one of the Examples above, and optionally, further including: decoding a DL transmission to the wireless apparatus within the soft resource only if the DL transmission is scheduled by downlink control information (DCI) or configured for synchronization signal block (SSB); and encoding an UL transmission for transmission by the wireless apparatus in the soft resource only if the UL transmission is scheduled by DCI.

Example 27 includes a device of a wireless apparatus, the device including: means for decoding a radio resource control (RRC) signal including an information element (IE) having an indication of a semi-statically configured soft resource; means for determining the soft resource based on the IE; and means for cancelling, based on the soft resource, at least one of a transmission of an uplink (UL) communication or a reception of a downlink (DL) communication by the wireless apparatus.

Example 28 includes the subject matter of Example 27, and optionally, wherein the RRC signal is from an integrated access and backhaul (IAB) donor central unit (CU).

Example 29 includes the subject matter of Example 28, and optionally, wherein the wireless apparatus is one of a new radio (N R) user equipment (UE) or a mobile terminal (MT) of a child IAB node (C-MTS).

Example 30 includes a device of a New Radio evolved Node B (gNodeB), the device including processing circuitry and a radio frequency (RF) interface coupled the processing circuitry, the processing circuitry to: encode for transmission a radio resource control (RRC) signal including an information element (IE) having an indication of a semi-statically configured soft resource to allow a wireless apparatus to cancel, based on the soft resource, at least one of a transmission of an uplink (UL) communication or a reception of a downlink (DL) communication by the wireless apparatus; and cause transmission of the RRC signal using the RF interface.

Example 31 includes the subject matter of Example 30, and optionally, wherein the gNodeB is an integrated access and backhaul (IAB) donor central unit (CU).

Example 32 includes the subject matter of Example 31, and optionally, wherein the wireless apparatus is one of a new radio (N R) user equipment (UE) or a mobile terminal (MT) of a child IAB node (C-MTS).

Example 33 includes the subject matter of Example 31, and optionally, wherein the semi-statically configured soft resource includes a plurality of semi-statically configured soft resources, and wherein the processing circuitry is to process backhaul or access
communications from the wireless apparatus on a subset of the semi-statically configured soft resources.

Example 34 includes the subject matter of Example 30, and optionally, wherein the semi-statically configured soft resource is one of cell-specific or user equipment (UE)-specific.

Example 35 includes the subject matter of Example 34, and optionally, wherein the indication is included in a TDD-UL-DL-ConfigCommon for the cell-specific semi-statically configured soft resource, or in a TDD-UL-DL-ConfigDedicated for a UE-specific semi-statically configured soft resource.

Example 36 includes the subject matter of any one of the Examples above, and optionally, wherein the IE includes one of: a start and length indicator (SLIV) for a slot within a downlink (DL) or an uplink (UL) resource configuration for the wireless apparatus, the SLIV to indicate symbols labelled as semi-statically configured soft resources within the DL or UL resource configuration; or a Soft-Resource-Pattern to explicitly state a starting slot or symbol and duration for each block of the semi-statically configured soft resource.

Example 37 includes the subject matter of any one of Examples 30-36, and optionally, wherein further including a front-end module coupled to RF interface.

Example 38 includes the subject matter of Example 37, and optionally, further including one or more antennas coupled to the front-end module to receive and transmit signals for processing by the processing circuitry.

Example 39 includes a method to be used at a device of a New Radio evolved Node B (gNodeB), the method includes: encoding for transmission a radio resource control (RRC) signal including an information element (IE) having an indication of a semi-statically configured soft resource to allow a wireless apparatus to cancel, based on the soft resource, at least one of a transmission of an uplink (UL) communication or a reception of a downlink (DL) communication by the wireless apparatus; and causing transmission of the RRC signal.

Example 40 includes the subject matter of Example 39, and optionally, wherein the gNodeB is an integrated access and backhaul (IAB) donor central unit (CU).

Example 41 includes the subject matter of Example 40, and optionally, wherein the wireless apparatus is one of a new radio (NR) user equipment (UE) or a mobile terminal (MT) of a child IAB node (C-MTS).

Example 42 includes the subject matter of Example 40, and optionally, wherein the semi-statically configured soft resource includes a plurality of semi-statically configured soft resources, the method including processing backhaul or access communications from the wireless apparatus on a subset of the semi-statically configured soft resources.

Example 43 includes the subject matter of any one of the Examples above, and optionally, wherein the semi-statically configured soft resource is one of cell-specific or user equipment (UE)-specific.

Example 44 includes the subject matter of Example 43, and optionally, wherein the indication is included in a TDD-UL-DL-ConfigCommon for the cell-specific semi-statically configured soft resource, or in a TDD-UL-DL-ConfigDedicated for a UE-specific semi-statically configured soft resource.

Example 45 includes the subject matter of any one of the Examples above, and optionally, wherein the IE includes one of: a start and length indicator (SLIV) for a slot within a downlink (DL) or an uplink (UL) resource configuration for the wireless apparatus, the SLIV to indicate symbols labelled as semi-statically configured soft resources within the DL or UL resource configuration; or a Soft-Resource-Pattern to explicitly state a starting slot or symbol and duration for each block of the semi-statically configured soft resource.

Example 46 includes a device of a New Radio evolved Node B (gNodeB), the device including: means for encoding for transmission a radio resource control (RRC) signal including an information element (IE) having an indication of a semi-statically configured soft resource to allow a wireless apparatus to cancel, based on the soft resource, at least one of a transmission of an uplink (UL) communication or a reception of a downlink (DL) communication by the wireless apparatus; and means for causing transmission of the RRC signal.

Example 47 includes the subject matter of Example 46, and optionally, wherein the gNodeB is an integrated access and backhaul (IAB) donor central unit (CU).

Example 48 includes the subject matter of Example 47, and optionally, wherein the wireless apparatus is one of a new radio (NR) user equipment (UE) or a mobile terminal (MT) of a child IAB node (C-MTS).

Example 49 includes a machine-readable medium including code which, when executed, is to cause a machine to perform the method of any one of claims 15-26 and 39-45.

Example 50 includes a machine-readable medium including code which, when executed, is to cause a machine to perform the method of any one of Examples 15-26 and 34-38.

Example 51 includes a product comprising one or more tangible computer-readable non-transitory storage media comprising computer-executable instructions operable to, when executed by at least one computer processor, enable the at least one computer processor to perform the method of any one of Examples 15-26 and 34-38.

Example 52 includes an apparatus comprising means for causing a wireless communication device to perform the method of any one of Examples 15-26 and 34-38.

Example 53 includes a signal as described in or related to any of the examples above, or portions or parts thereof.

Example 54 includes a signal in a wireless network as shown and described herein.

Example 55 includes a method of communicating in a wireless network as shown and described herein.

Example 56 includes a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A wireless communication device, comprising a memory and a baseband processor configured to, when executing instructions stored in the memory, cause the wireless communication device to, in response to being configured by a first radio resource control (RRC) signal to communicate a message in a set of symbols,
    decode a second RRC signal, different from the first RRC signal, the second RRC signal including an information element (IE) having an indication of a subset of symbols from the set of symbols that are a semi-statically configured soft resource, wherein the IE includes a start and length indicator (SLIV) for a slot within a downlink (DL) or an uplink (UL) resource configuration for the wireless communication device, the SLIV to indicate symbols labelled as semi-statically configured soft resources within the DL or UL resource configuration, wherein the second RRC signal is received from a new radio (NR) integrated access and backhaul (IAB) donor central unit (CU);
    determine the semi-statically configured soft resource based on the IE; and
    cancel, based on the semi-statically configured soft resource, communication of the message by the wireless communication device.

2. The wireless communication device of claim 1, wherein the wireless communication device is one of a new radio (NR) user equipment (UE) or a mobile terminal (MT) of a child IAB node (C-MTS).

3. The wireless communication device of claim 2, wherein the semi-statically configured soft resource includes a plurality of semi-statically configured soft resources, and wherein the baseband processor is configured to use a subset of the semi-statically configured soft resources for backhaul or access communications.

4. The wireless communication device of claim 1, wherein the semi-statically configured soft resource is one of cell-specific or user equipment (UE)-specific.

5. The wireless communication device of claim 4, wherein the indication is included in a TDD (Time Division Duplexing)-UL-DL-ConfigCommon for the cell-specific semi-statically configured soft resource, or in a TDD-UL-DL-ConfigDedicated for a UE-specific semi-statically configured soft resource.

6. The wireless communication device of claim 1, wherein the baseband processor is configured to determine a UL or DL direction of a slot or symbol based on the semi-statically configured soft resource.

7. The wireless communication device of claim 1, wherein the IE includes:
    a Soft-Resource-Pattern to explicitly state a starting slot or symbol and duration for each block of the semi-statically configured soft resource.

8. The wireless communication device of claim 1, wherein:
    the communication is a downlink (DL) communication that includes at least one of a channel state information reference signal (CSI-RS) or a physical downlink shared channel (PDSCH); or
    an uplink (UL) communication that includes at least one of a sounding reference signal (SRS), a physical uplink control channel (PUCCH), a physical uplink shared channel (PUSCH), or a physical random access channel (PRACH).

9. The wireless communication device of claim 8, wherein the baseband processor is configured to decode higher layer signaling and to configure the CSI-RS and the PDSCH in a subset of symbols of the semi-statically configured soft resource based on higher layer signaling.

10. The wireless communication device of claim 1, wherein the baseband processor is configured to:
decode a DL transmission to the wireless communication device within the semi-statically configured soft resource only if the DL transmission is scheduled by downlink control information (DCI) or configured for synchronization signal block (SSB); and
encode an UL transmission for transmission by the wireless communication device in the semi-statically configured soft resource only if the UL transmission is scheduled by DCI.

11. A method, comprising:
in response to being configured by a first radio resource control (RRC) signal to communicate a message in a set of symbols,
receiving, from a new radio (NR) integrated access and backhaul (IAB) donor central unit (CU), and second RRC signal, different from the first RRC signal, the second RRC signal including an information element (IE) having an indication of a subset of symbols from the set of symbols that are a semi-statically configured soft resource, wherein the IE includes a start and length indicator (SLIV) for a slot within a downlink (DL) or an uplink (UL) resource configuration for a wireless communication device, the SLIV to indicate symbols labelled as semi-statically configured soft resources within the DL or UL resource configuration;
determining the semi-statically configured soft resource based on the IE; and
cancelling, based on the semi-statically configured soft resource, communication of the message by the wireless communication device.

12. The method of claim 11, wherein the wireless communication device is one of a new radio (NR) user equipment (UE) or a mobile terminal (MT) of a child IAB node (C-MTS).

13. The method of claim 12, wherein the semi-statically configured soft resource includes a plurality of semi-statically configured soft resources, the method further including using a subset of the semi-statically configured soft resources for backhaul or access communications.

14. The method of claim 11, wherein the semi-statically configured soft resource is one of cell-specific or user equipment (UE)-specific.

15. The method of claim 14, wherein the indication is included in a TDD (Time Division Duplexing)-UL-DL-ConfigCommon for the cell-specific semi-statically configured soft resource, or in a TDD-UL-DL-ConfigDedicated for a UE-specific semi-statically configured soft resource.

16. The method of claim 11, further including determining a UL or DL direction of a slot or symbol based on the semi-statically configured soft resource.

17. The method of claim 11, wherein the IE includes:
a Soft-Resource-Pattern to explicitly state a starting slot or symbol and duration for each block of the semi-statically configured soft resource.

18. The method of claim 11, wherein:
the communication is an uplink (UL) communication corresponding to a RRC configured UL transmission by a wireless apparatus, or
a downlink (DL) communication corresponding to a RRC configured DL reception by the wireless apparatus within the semi-statically configured soft resource.

19. The method of claim 11, wherein:
the communication is a downlink (DL) communication that includes at least one of a channel state information reference signal (CSI-RS) or a physical downlink shared channel (PDSCH); or
an uplink (UL) communication that includes at least one of a sounding reference signal (SRS), a physical uplink control channel (PUCCH), a physical uplink shared channel (PUSCH), or a physical random access channel (PRACH).

20. The method of claim 11, further including:
decoding a DL transmission to the wireless communication device within the semi-statically configured soft resource only if the DL transmission is scheduled by downlink control information (DCI) or configured for synchronization signal block (SSB); and
encoding an UL transmission for transmission by the wireless communication device in the semi-statically configured soft resource only if the UL transmission is scheduled by DCI.

21. A device, comprising:
a memory and baseband processor configured to, when executing instructions stored in the memory, cause the device to, transmit, to a wireless communication device configured by a first radio resource control (RRC) signal to communicate a message in a set of symbols, a second RRC signal, different from the first RRC signal, the second RRC signal including an information element (IE) having an indication of a subset of symbols from the set of symbols that are a semi-statically configured soft resource, wherein the IE includes a start and length indicator (SLIV) for a slot within a downlink (DL) or an uplink (UL) resource configuration for the device, the SLIV to indicate symbols labelled as semi-statically configured soft resources within the DL or UL resource configuration;
determine the semi-statically configured soft resource based on the IE; and
cancel, based on the semi-statically configured soft resource, communication of the message by the device.

22. The device of claim 21, wherein the device is a new radio (NR) integrated access and backhaul (IAB) donor central unit (CU).

* * * * *